United States Patent [19]
Arai et al.

[11] Patent Number: 5,621,608
[45] Date of Patent: Apr. 15, 1997

[54] SOLID ELECTROLYTIC CAPACITOR HAVING TWO SOLID ELECTROLYTE LAYERS AND METHOD OF MANUFACTURING THE SAME

[75] Inventors: Satoshi Arai; Takashi Fukaumi; Toshihiko Nishiyama; Hiromichi Taniguchi; Atsushi Kobayashi, all of Tokyo, Japan

[73] Assignee: NEC Corporation, Tokyo, Japan

[21] Appl. No.: 562,467

[22] Filed: Nov. 24, 1995

[30]   Foreign Application Priority Data

Nov. 25, 1994   [JP]   Japan ..................... 6-315576

[51] Int. Cl.$^6$ ................................. H01G 9/025
[52] U.S. Cl. .................. 361/525; 361/502; 361/509; 361/529; 361/528; 361/508; 29/25.03
[58] Field of Search .................. 361/508, 509, 361/523, 524, 525, 528, 529, 500, 511, 530; 29/25.03

[56]   References Cited

U.S. PATENT DOCUMENTS

| | | | |
|---|---|---|---|
| 5,428,500 | 6/1995 | Nishiyama et al. | 361/525 |
| 5,457,862 | 10/1995 | Sakata et al. | 29/25.03 |
| 5,461,537 | 10/1995 | Kobayashi et al. | 361/525 |
| 5,473,503 | 12/1995 | Sakata et al. | 361/525 |

FOREIGN PATENT DOCUMENTS

| | | |
|---|---|---|
| 0379372 | 7/1990 | European Pat. Off. . |
| 0637043 | 2/1995 | European Pat. Off. . |

*Primary Examiner*—Leo P. Picard
*Assistant Examiner*—Anthony Dinkins
*Attorney, Agent, or Firm*—Sughrue, Mion, Zinn, Macpeak & Seas

[57]   ABSTRACT

In a solid electrolytic capacitor which employs a conducting polymer as the solid electrolyte, a first solid electrolytic layer (3) consisting of a sole conducting polymer is formed by chemical polymerization on an oxide film (2) formed on the surface of an anode body (1). Next, a second solid electrolytic layer (4) consisting of a conducting polymer containing fine powder, obtained by chemical polymerization using a solution in which fine powder is dispersed in a reaction solution for chemical polymerization, is formed on the first solid electrolytic layer (3). The fine powder is harder than the conducting polymer. With this arrangement, it is possible to prevent the application of a stress to the oxide film (2) by the solid electrolytic layer (4) consisting of a conducting polymer containing fine powder even if there is generated a stress at the time of curing of a molded resin (8).

12 Claims, 1 Drawing Sheet

SOLID ELECTROLYTIC CAPACITOR HAVING TWO SOLID ELECTROLYTE LAYERS AND METHOD OF MANUFACTURING THE SAME

BACKGROUND OF THE INVENTION (1) Field of the Invention

The present invention relates to a solid electrolytic capacitor and a method of manufacturing the same, and more particularly, to a solid electrolytic capacitor having a two-layer structure of a electrically conducting polymer as a solid electrolyte layer.

(2) Description of the Related Art

A solid electrolytic capacitor comprises an etched foil or a sintered body of powder of a valve metal such as aluminum or tungsten as the anode body, and an oxide film formed on the surface of the anode body serving as a dielectric body. The capacitor further comprises a negative electrode layer formed on the oxide film consisting of a solid electrolytic layer, a graphite layer formed thereon, and a metallic layer such as a silver paste layer.

In recent years, a conductive polymer is used as the solid electrolyte instead of using a conventional manganese dioxide. Since a conductive polymer has a higher electrical conductivity compared with the manganese dioxide, it is expected to obtain a solid electrolytic capacitor having an excellent frequency characteristic with small loss component even at high frequencies.

The conductive polymer as a solid electrolyte can be formed by using either one of methods of vapor phase polymerization, chemical polymerization or electrolytic polymerization.

The vapor phase polymerization is a method in which the anode body is immersed in a solution containing an oxidant and a dopant, then exposing the anode body to the monomer vapor of the conductive polymer to induce polymerization.

The chemical polymerization is a method in which polymerization is effected by alternately immersing the anode body in a solution containing an oxidant and a dopant and a monomer solution of a conductive polymer, or by preparing a reaction solution at a low temperature in advance, immersing the anode body in the reaction solution, then effecting polymerization in the process of raising the temperature.

The electrical polymerization is a method in which the anode body is immersed in an electrolytic solution containing the monomer of a conductive polymer dissolved therein, and effecting polymerization by applying a voltage.

Each of these polymerization methods has its own feature. Namely, the vapor polymerization produces a layer which shows an excellent adhesion to the dielectric body, but the layer produced is coarse such that its adhesion to the graphite layer and the silver paste layer is poor when left as it is and its characteristics are unstable.

The chemical polymerization also produces a layer with an excellent adhesion to the dielectric body, but the compactness of the produced layer is inferior to that obtained by the electrolytic polymerization. The electrolytic polymerization can form a compact layer, but its adhesion to the dielectric body is poor, and the method requires an underlying layer which serves as an electrode in applying a voltage.

For these reasons, two-layer structure of conductive polymer as the solid electrolytic layer is suggested. For example, Japanese Unexamined Patent Application (Kokai) No. 64-21913 (1989) shows a method in which a solid electrolytic layer consisting of a second conductive polymer compound obtained by the electrolytic polymerization is formed on a solid electrolytic layer consisting of a first conductive polymer compound obtained by the vapor phase polymerization. Further, another Japanese Unexamined Patent Application (Kokai) No. 3-46215 (1991) discloses a method in which a conductive polymer film obtained by the electrolytic polymerization is formed after the formation of a conductive polymer film obtained by the chemical polymerization is formed, in order to obtain a solid electrolytic layer.

In these two-layer structure, since the solid electrolytic layer is constituted exclusively of a soft conductive polymer, the strength for protecting the oxide film against an external stress is not sufficiently high compared with manganese dioxide.

Because of this, when an external mechanical stress is applied to the outside of the capacitor, the oxide film tends to be damaged, and the leakage current characteristic of the capacitor is deteriorated. In particular, since a large stress is generated at the time of the external packaging with resin during the manufacturing processes, the leakage current increases after this process.

SUMMARY OF THE INVENTION

It is an object of the present invention to provide a solid electrolytic capacitor which has a solid electrolytic layer of two-layer structure with increased hardness to reduce the leakage current.

It is another object of the present invention to provide a method of manufacturing a solid electrolytic capacitor where the oxide film is protected against an external mechanical stress applied to the capacitor.

According to the present invention, a solid electrolytic layer of two-layer structure comprises a conductive polymer, namely, a first solid electrolytic layer consisting exclusively of a conductive polymer and a second solid electrolytic layer consisting of the conductive polymer containing fine powder which is formed on the outside of the first layer. The fine powder must be harder than the conductive polymer to increase the hardness of the second solid electrolytic layer.

As the fine powder, one kind, or two or more kinds of dielectric fine powder are selected from silica, alumina, zirconia or the like.

Otherwise, one kind, or two or more kinds of metallic powders from among the group of gold, silver, copper, nickel, palladium, or the alloys of these, may be selected as the inorganic fine powder.

Further, according to this invention, a method of manufacturing a solid electrolytic capacitor can also be obtained in which the method of formation of the second solid electrolytic layer consisting of a conductive polymer containing fine powder is characterized in that fine powder is dispersed in the reaction solution for polymerization, and the fine powder is taken into the conductive polymer layer at the same time with the formation of the layer.

In this invention, the oxide film is protected against an external mechanical stress applied to the capacitor by forming a second solid electrolytic layer with increased hardness brought about by the inclusion of fine powder, on the outside of a first solid electrolytic layer consisting exclusively of a conductive polymer.

DESCRIPTION OF THE PREFERRED EMBODIMENTS

Figure 1:
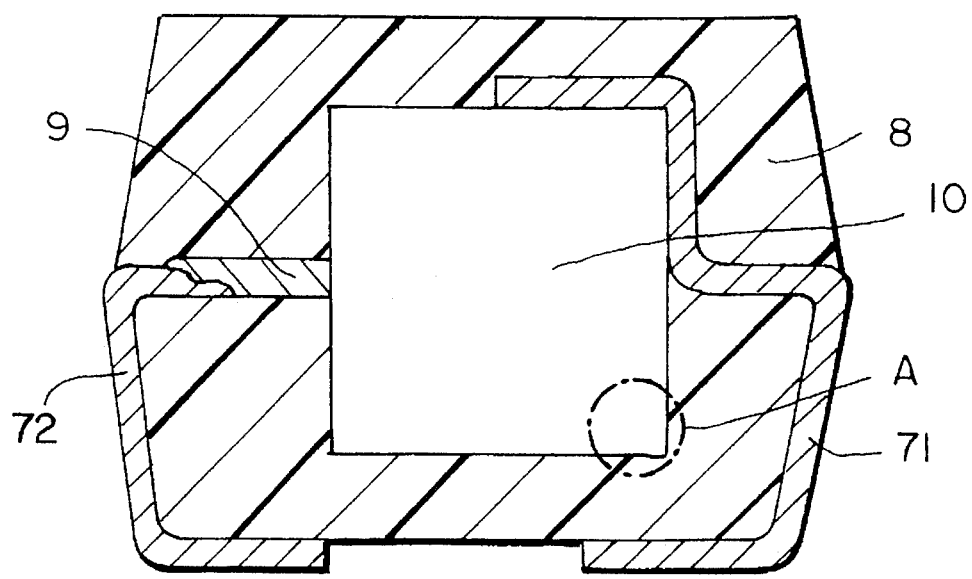
FIG. 1 is a sectional view of the solid electrolytic capacitor according to this invention.
Figure 2:
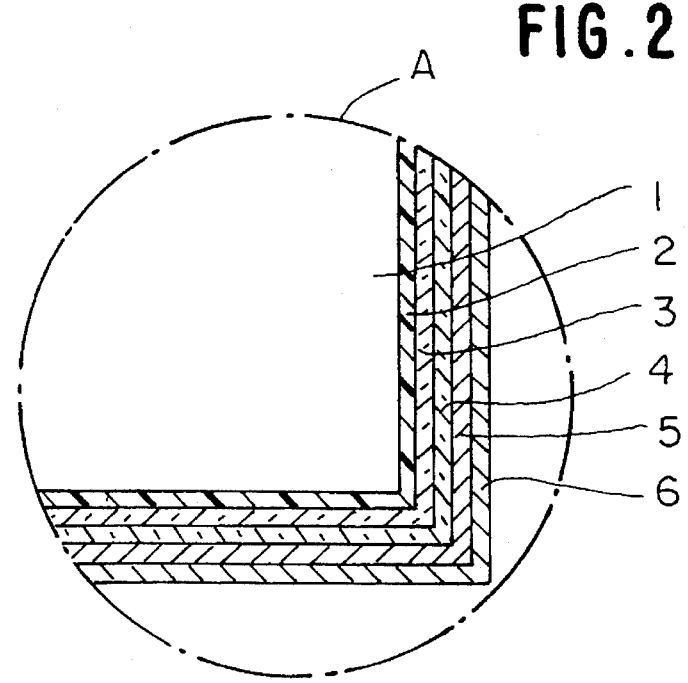
FIG. 2 is an enlarged view of the portion marked "A" in FIG. 1.

Referring to FIG. 1, external leads 71 and 72 are connected to the solid electrolytic capacitor element 10 which is molded with a resin. As shown in FIG. 2, the cathode part of the solid electrolytic capacitor element 10 of this invention has a multilayer structure.

After forming an oxide film 2 on an anode body 1 consisting of a sintered body of tantalum powder, a first conductive polymer layer 3 consisting solely of polypyrrole and a second conductive polymer layer 4 consisting of polypyrrole containing fine powder of silica are formed successively. Following that, a graphite layer 5 and a silver paste layer 6 are formed successively to form a cathode layer of four-layer structure. An external cathode lead 71 is connected to the cathode layer with a conductive paste. An anode wire 9 of tantalum wire or the like is led out of the sintered body 1 of tantalum and is connected to an external anode lead 72. The capacitor is molded with resin by using transfer molding process. The solid electrolytic capacitor shown in FIG. 1 is obtained by bending the pair of external lead wires 71 and 72 downward along the molded resin 8.

The first conductive polymer layer 3 consisting exclusively of polypyrrole is formed by polymerization mediated by the chemical reaction between pyrrole and an oxidant such as the ferric salt of p-toluenesulfonic acid, through repetition for several times of the immersion of the sintered body 1 in a monomer solution of pyrrole followed by the immersion of it in a solution of the oxidant. The second solid electrolytic layer 4 consisting of polypyrrole containing fine powder of silica is formed by preparing a monomer solution of pyrrole in which is dispersed fine powder of silica with mean particle diameter of 0.01 μm, immersing the sintered body in this solution, then immersing it in the solution of the oxidant to effect the polymerization. The fine powder of silica is taken into the interior of the polyprrole layer during this chemical polymerization process.

This method has an excellent productivity since the second conductive polymer layer containing fine powder can be formed by the simple replacement of the monomer solution of pyrrole at the time of polymerization by the solution in which the fine powder is dispersed.

The silica fine powder to be dispersed in the monomer solution of pyrrole is ineffective if the amount of addition is too small, and reduces the electrical conductivity of polypyrrole if the amount of addition is too much, so that the range of the amount of addition was confirmed empirically.

In Table 1 are shown the percent defective due to leakage current after packaging of the solid electrolytic capacitors manufactured by varying the addition amount of silica fine powder and the mean value of the equivalent series resistance (ESR).

TABLE 1

Table 1 Amount of Addition of Silica Fine Powder and Defective Rate due to Leakage Current and Mean Value of ESR after Outer Packaging of Solid Electrolytic Capacitor

| Amount of Addition of Silica Fine Powder (%) | Defective Rate due to Leakage Current after Outer Packaging (%) | 10 μF/6.3 V Mean Value of ESR (mΩ) |
|---|---|---|
| No addition (Prior example) | 30 | 250 |
| 0.5 | 20 | 250 |
| 1 | 5 | 250 |
| 2 | 4 | 260 |
| 5 | 4 | 260 |
| 7 | 3 | 260 |
| 10 | 2 | 330 |

Leakage current specification: 500 nA or less (5-minute value)
ESR: 100 kHz

The result shows that when the amount of addition of silica fine powder is less than 1% in weight percent, there does not appear conspicuous difference in the percent defective due to leakage current after the packaging, compared with the case of no addition the fine powder, whereas when the amount of addition is 10% or more, the mean value of ESR becomes large due to reduction in the electrical conductivity of polypyrrole. Therefore, the preferable range of amount of addition of the fine powder is 1% or more and less than 10%, more appropriately in the range of 1 to 7%.

As for the experiment on the amount of addition of fine powder of silica, as well as on the amount of addition of fine powder of alumina or zirconia, or on the amount of addition of two or more kinds of fine powder from among silica, alumina and zirconia, it was found that it is ineffective if the amount of addition is too small, whereas the electrical conductivity of polypyrrole is reduced if the amount of addition is too much. Therefore, the preferable range of addition of the fine powder was found to be 1% or more and less than 10%, and more appropriately in the range of 1 to 7%.

In a second embodiment, solid electrolytic capacitors are formed in the manner similar to the first embodiment by using fine powder of insulators such as alumina and zirconia other than silica, and fine powder of metals such as gold, silver, copper, nickel, palladium, silver-palladium alloy as the fine powders to be dispersed in the monomer solution of pyrrole.

TABLE 2

Table 2 Amount of Addition of Silica Fine Powder and Defective Rate due to Leakage Current and Mean Value of ESR after Outer Packaging of Solid Electrolytic Capacitor

| Kind of Added Fine Powder | Defective Rate due to Leakage Current after Outer Packaging (%) | 10 μF/6.3 V Mean Value of ESR (mΩ) |
|---|---|---|
| No addition (prior example) | 30 | 250 |
| Silica (Embodiment 1) | 4 | 260 |
| Alumina | 3 | 270 |
| Zironia | 5 | 260 |
| Silica + Alumina (1:1) | 3 | 270 |
| Gold | 6 | 240 |
| Silver | 7 | 240 |
| Copper | 7 | 250 |
| Nickel | 6 | 250 |

TABLE 2-continued

Table 2 Amount of Addition of Silica Fine Powder and
Defective Rate due to Leakage Current and Mean Value of
ESR after Outer Packaging of Solid Electrolytic Capacitor

| Kind of Added Fine Powder | Defective Rate due to Leakage Current after Outer Packaging (%) | 10 μF/6.3 V Mean Value of ESR (mΩ) |
|---|---|---|
| Palladium | 5 | 250 |
| Silver-Palladium Alloy (1:1) | 6 | 240 |

Leakage Current Specification: 500 nA or less (5-minute value)
ESR: 100 kHz

In Table 2 are shown the percent defective due to leakage current and the mean value of ESR after the outer packaging of the solid electrolytic capacitors manufactured by using various kinds of fine powder.

The percent defective due to leakage current after the outer packaging with resin of this embodiment is in the range of 3 to 7% as can be seen from Table 2 and shows that the percent defective is improved compared with the case of no addition of fine powder.

The amount of addition of fine powder in Table 2 is five weight percent, for all kinds of fine powder.

As to the amount of addition of one kind, or two or more kinds of fine powders of metals such as gold, silver, copper, nickel, palladium and alloys of these metals to a conductive polymer was found to be ineffective if the amount of addition is too small, and reduces the electrical conductivity of pyrrole itself if the amount is increased but not to the extent that the fine powders are contacted to each other. Therefore, the preferable range of addition of the fine powder was found to be 1% or more and less than 10%, and more appropriately in the range of 1 to 7%.

Besides, the particle diameter of these fine powders is preferable to be small. However, in this embodiment, specifically, fine powder of alumina with mean particle diameter of 0.01 μm, and fine powder of zirconia, gold, copper, nickel, palladium, and silver-palladium alloy with mean particle diameter of 0.1 μm were used.

In this embodiment, the invention has been described by taking the polymerization method of forming polypyrrole by alternately immersing the anode body in the monomer solution of pyrrole and the solution of an oxidant. However, in the method of preparing a reaction solution at a low temperature in advance, and inducing polymerization by raising the temperature after immersion of the anode body in the reaction solution, it is obvious that similar effects can also be obtained if the fine powder is added beforehand in the reaction solution.

Moreover, the case of using polypyrrole as the conductive polymer has been described in this embodiment, but similar effects can also be obtained by the use of a conductive polymer, such as polyaniline or polythiophene, which can be formed by polymerization reaction in the solution.

Furthermore, the present embodiment has been described for the case where the fine powder to be added to the second conductive polymer is one kind selected from among the fine powders of silica, alumina and zirconia, but similar effects can be obtained when two or more kinds of the fine powders are added.

Furthermore, the present embodiment has been described for the case of selecting gold, silver, copper, nickel, palladium or silver-palladium alloy as the fine powder to be added to the second conductive polymer, but similar effects can be obtained in the case of selecting fine powder of an alloy of gold, silver, copper, nickel and palladium besides the silver-palladium alloy, or in the case of adding two or more kinds selected from among fine powders of metal and fine powders of alloy.

Moreover, inorganic substances have been taken up as the examples of fine powder, but fine powder of organic substances which have higher hardness than that of the conductive polymer layer may also be employed. One example is epoxy resin which is harder than polypyrrole. Still further, chemical polymerization has been adopted in this embodiment for the formation of the solid electrolytic layers, but vapor phase polymerization may also be adopted for that purpose.

As described in the above, according to the present invention, by giving a two-layer structure to the solid electrolytic layer in which a second solid electrolytic layer consisting of a conductive polymer containing fine powder for increasing the hardness is formed on the first solid electrolytic layer consisting exclusively of a conductive polymer, it is possible to protect the oxide film agains an external mechanical stress applied to the capacitor, and obtain a capacitor with less degradation due to leakage current. Namely, even when a mechanical stress is applied from outside, the oxide film will not be damaged, and a degradation in the leakage current characteristic of the capacitor can be prevented.

In addition, since the stress generated at the time of outer packaging with resin during the manufacturing processes can be made small, the invention has the effect of preventing an increase in the leakage current after the packaging process.

What is claimed is:

1. A solid electrolytic capacitor comprising:

an anode body consisting of a valve metal;

an oxide film formed on a surface of said anode body;

a first solid electrolytic layer consisting of a conductive polymer formed on said oxide film;

a second solid electrolytic layer consisting of a conductive polymer formed on said first solid electrolytic layer;

a fine powder dispersed within said second solid electrolytic layer, said fine powder being harder than said conductive polymer and of sufficiently small size not to cause a surface of said second solid electrolytic layer to be an uneven surface; and a metallic layer formed on said second solid electrolytic layer.

2. A solid electrolytic capacitor as claimed in claim 1, wherein said fine powder has a mean particle diameter of 0.01 μm.

3. A solid electrolytic capacitor as claimed in claim 1, wherein said fine powder consists of a member selected from a group consisting of silica, alumina, and mixture thereof.

4. A solid electrolytic capacitor as claimed in claim 1, wherein said fine powder consists of a member selected from a group consisting of gold, silver, nickel, palladium and alloys thereof.

5. A solid electrolytic capacitor as claimed in claim 2, wherein said fine powder consists of a member selected from a group consisting of silica, alumina, and mixture thereof.

6. A solid electrolytic capacitor as claimed in claim 2, wherein said fine powder consists of a member selected from a group consisting of gold, silver, nickel, palladium and alloys thereof.

7. A solid electrolytic capacitor having reduced leakage current after outer packaging comprising:

an anode body consisting of a valve metal;

an oxide film formed on a surface of said anode body;

a first solid electrolytic layer consisting of a conductive polymer formed on said oxide film;

a second solid electrolytic layer consisting of a conductive polymer containing electrically insulative fine powder formed on said first solid electrolytic layer, said fine powder being harder than said conductive polymer and amount of addition thereof being at least 1 wt % and less than 10 wt %.

8. A solid electrolytic capacitor as claimed in claim 7, wherein said electrically insulative fine powder consists of a member selected from a group consisting of silica, alumina, zirconia and mixture thereof.

9. A solid electrolytic capacitor as claimed in claim 8, wherein said amount of addition of said fine powder is in a range of 1 wt % to 7 wt %.

10. A method of manufacturing a solid electrolytic capacitor comprising:

a step of forming an oxide film as a dielectric body on a surface of an anode body consisting of a valve metal;

a step of forming a first solid electrolytic layer consisting of a conductive polymer on said oxide film;

a step of forming a second solid electrolytic layer on said first solid electrolytic layer, consisting of forming from a reaction solution a conductive polymer containing fine powder of inorganic material, said fine powder having a mean particle diameter of 0.01 μm and being harder than said conductive polymer, and said reaction solution containing said fine powder; and a step of forming a metallic layer on said second solid electrolytic layer.

11. A method of manufacturing a solid electrolytic capacitor as claimed in claim 10, wherein said fine powder consists of a member selected from a group consisting of silica, alumina, zirconia and mixture thereof.

12. A method of manufacturing a solid electrolytic capacitor as claimed in claim 10, wherein said fine powder consists of a member selected from a group consisting of gold, silver, nickel, palladium and alloys thereof.

\* \* \* \* \*